United States Patent
Miller et al.

[11] Patent Number: 6,085,695
[45] Date of Patent: Jul. 11, 2000

[54] UNIVERSALLY ATTACHABLE LEASH BAG

[76] Inventors: La Rae Lee Miller; Lori Ann Miller, both of 1794 S. Gilpin St., Denver, Colo. 80250

[21] Appl. No.: 09/109,350

[22] Filed: Jun. 30, 1998

[51] Int. Cl.[7] ..................................................... A01K 27/00
[52] U.S. Cl. .......................... 119/795; 224/604; 224/605; 43/26; 383/41; 383/72
[58] Field of Search .................................... 119/795, 792, 119/797, 858; 224/603, 604, 605; 383/72, 41; 206/315.11, 317; 42/96; 43/26

[56] References Cited

U.S. PATENT DOCUMENTS

| | | | |
|---|---|---|---|
| 2,364,340 | 12/1944 | Bogg, Jr. | 42/96 |
| 2,497,325 | 2/1950 | Scherba | 383/38 |
| 2,618,880 | 11/1952 | Sourek | 43/26 |
| 2,854,775 | 10/1958 | Kleckley | 43/26 |
| 3,437,247 | 4/1969 | Gantress | 42/96 |
| 4,136,478 | 1/1979 | Wycosky | 43/26 |
| 4,641,454 | 2/1987 | Ray et al. | 43/26 |
| 4,858,361 | 8/1989 | White | 42/96 |
| 5,233,942 | 8/1993 | Cooper et al. | 119/792 |
| 5,327,669 | 7/1994 | Lannan et al. | 43/26 |
| 5,363,809 | 11/1994 | Roe | 119/792 |
| 5,441,017 | 8/1995 | Lindsay | 119/795 |
| 5,451,108 | 9/1995 | Anderson | 383/38 |
| 5,456,062 | 10/1995 | Wechsler | 53/468 |
| 5,560,321 | 10/1996 | Hess | 119/858 |
| 5,692,836 | 12/1997 | Mitchell | 383/40 |
| 5,718,192 | 2/1998 | Sebastian | 119/795 |
| 5,839,631 | 11/1998 | Hebert et al. | 224/251 |

FOREIGN PATENT DOCUMENTS

| | | | |
|---|---|---|---|
| 74933 | 11/1918 | Austria . | |
| 2055507 | 5/1993 | Canada . | |
| 684045 | 7/1994 | Switzerland . | |
| 2268157 | 1/1994 | United Kingdom | 383/41 |

OTHER PUBLICATIONS

Article AI, Leash Luggage by Leash Luggage of Irvine, California, U.S..A.

Primary Examiner—Michael J. Carone
Assistant Examiner—James S. Bergin
Attorney, Agent, or Firm—Rick Martin; Patent Law Offices of Rick Martin, P.C.

[57] ABSTRACT

A pet leash bag is attachable to a pet leash for carrying or holding articles such as pet waste disposal bags, other pet accessories or toys and personal articles of the pet owner. The bag can be fabricated from many different materials and has many embodiments including single or multi-compartment bags, bags with internal and external pockets and bags of different dimensions and size.

12 Claims, 4 Drawing Sheets

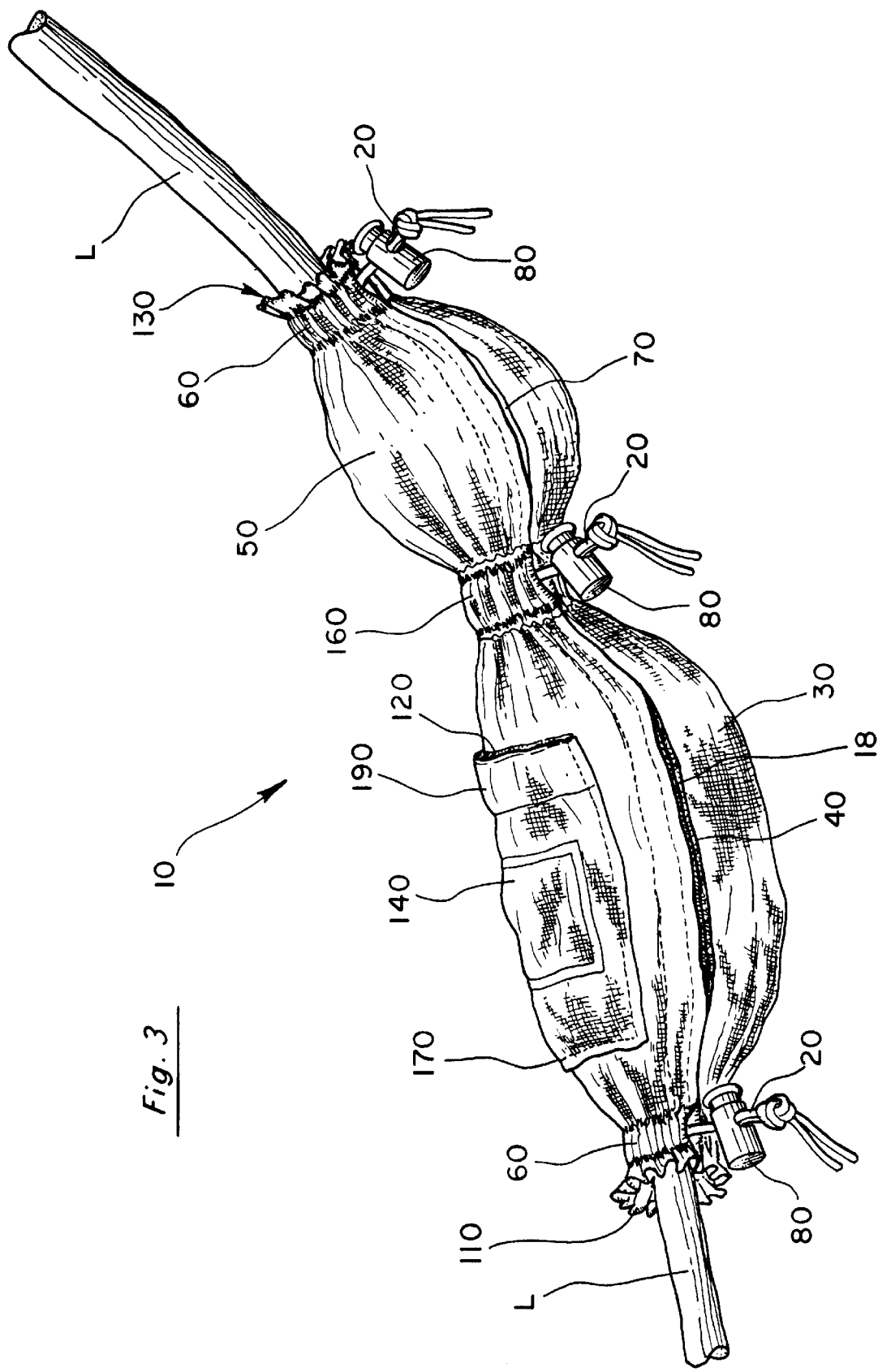

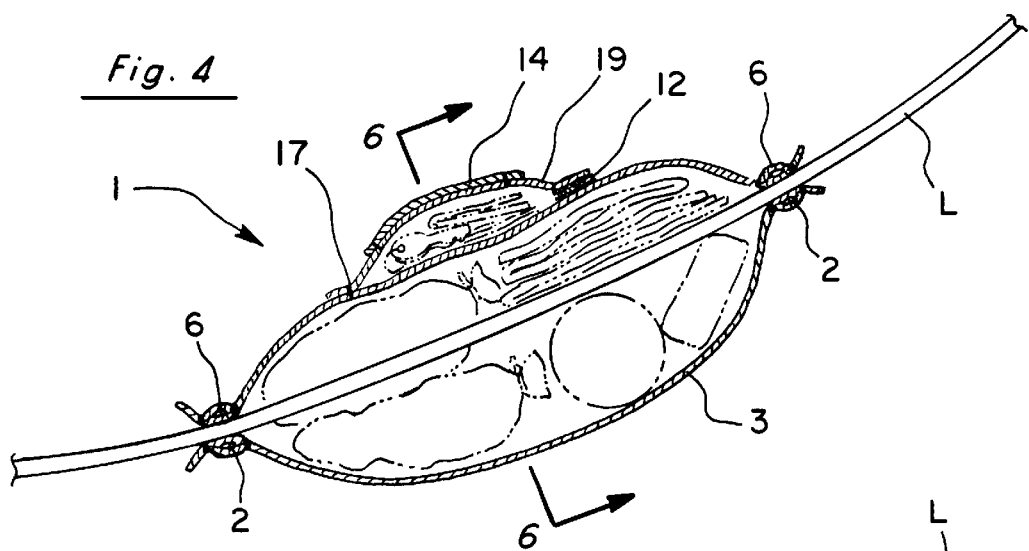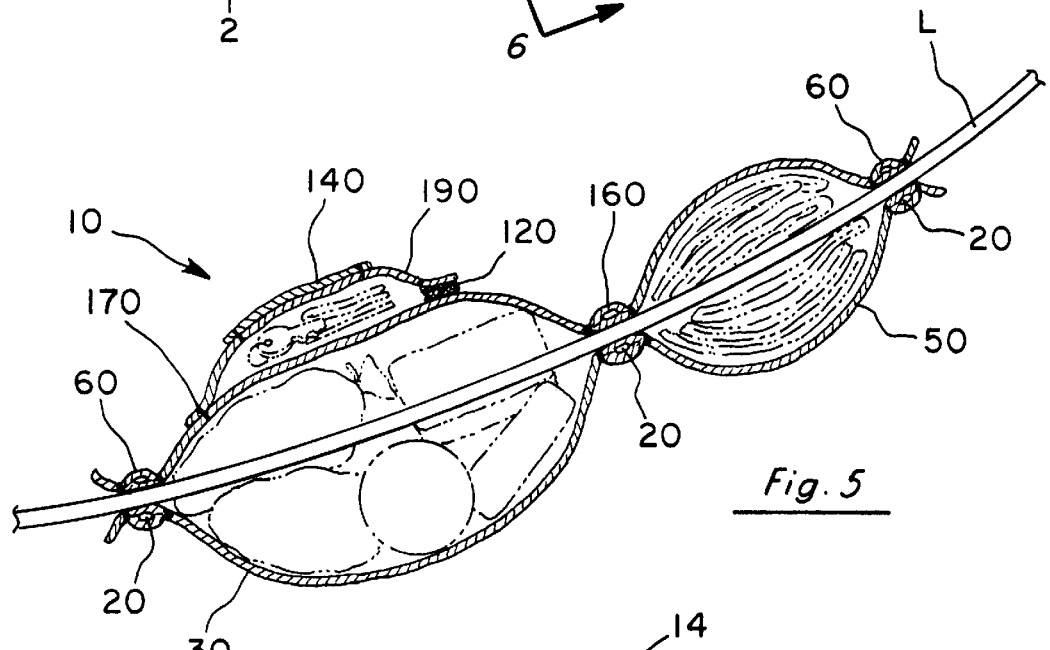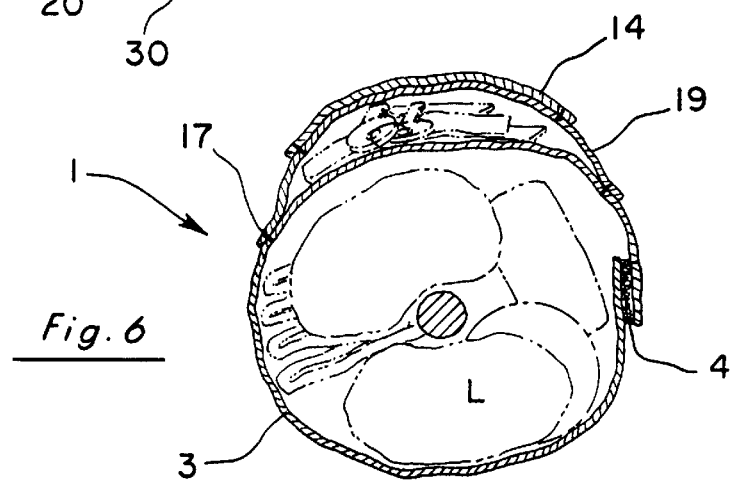

UNIVERSALLY ATTACHABLE LEASH BAG

FIELD OF INVENTION

The present invention relates to a container for holding waste disposal bags on a pet leash.

BACKGROUND OF THE INVENTION

As urban pet ownerships have sharply increased, so have the number of municipal ordinances mandating the clean-up of pet waste by the pet owner. These "curbing" ordinances, which had previously applied mostly to city sidewalks, have expanded to include parks, neighborhoods, hiking and bicycling trails, beaches and other outdoor public areas.

While these ordinances mandate pet waste retrieval or removal, other ordinances require pet owners to have pets restrained at all times in public areas. These "leash laws" pertain almost exclusively to dogs and, combined with registration ordinances, are designed to control the increase in dog populations, wandering, dog attacks and other public health concerns involving pet waste and reproduction.

The fact that pet owners, particularly dog owners, are subject to both leash and curbing laws when they take their pets outside in public places, has led to a proliferation of devices designed to be carried by a pet owner during their walks for the retrieval of pet waste and its easy disposal. Many pet owners, however, find these devices awkward, bulky or difficult to carry. As such, pet owners have resorted to making a habit of carrying kitchen, grocery, newspaper or other disposable bags with them, which they use to retrieve their pet's waste for later disposal in an appropriate manner as an acceptable replacement for these devices. Such a solution, however, requires the pet owner to have the foresight to anticipate pet needs and/or remember to bring the bags with them on every walk.

Furthermore, traditional walking of pets has evolved with today's active culture. People now have dogs and other pets accompany them while jogging, running, in-line skating, biking, hiking, cross-country skiing and many other outdoor activities. In many cases, the exercise outfits they wear are unsuited for carrying items either because the outfits lack pockets completely or carrying items will interfere with the activity's enjoyment. Items such as disposable bags, pet treats, pet toys and personal items of the owner such as gloves, tissues, identification, drivers licenses, credit cards, cash and keys have to be carried in the owner's hand or left behind.

Common attempted solutions to this problem include carrying cases/leash combinations which restrict the owner from separating the case from the leash. Other devices allow accessories to hang from a leash handle or the collar of the pet in an awkward fashion. The former solution hampers the pet owner by limiting him or her to one particular leash. As the pet grows or as the owner uses the leash for different functions, there is a need by the owner to vary the length, strength or other characteristics of the pet's leash or to own several different types of leashes. Absent a removable, universal leash bag, the owner is prevented from doing so. The other solution, a bag that hangs from the leash handle or pet's collar, requires the leash bag to be connected at a particular point on the leash, resulting in awkwardness for the pet owner or the pet as their particular activity or the objects carried dictated. This awkwardness is substantially increased if the added weight of the pet's waste is added following owner clean up.

For the foregoing reasons, a need exists for a carrying case that is lightweight, flexible and inexpensive to produce which integrates easily with any pet leash. The present invention can moved to any point on the leash in a manner that is convenient, thereby minimizing interference with the activities of the owner and the pet.

The present invention provides a carrying case which is simply integrated with and removed from any pet leash, at any location on the leash, which has the ability to accommodate several items such as personal belongings of the pet owner and pet as well as providing a replenishable, ready source of disposable pet waste retrieval bags and the ability to carry "full" bags after clean up.

SUMMARY OF THE INVENTION

The instant invention is directed to an application which satisfies these storage needs and solves the above problems by providing a bag type enclosure wrapped around a leash, securable at any portion of the leash and able to hold objects. This universally attachable pet bag is divided into compartments for carrying, in separate portions, pet waste disposal bags, pet toys and treats, pet owner personal belongings and even the retrieved pet waste. The pet bag both carries and dispenses the particular waste disposal bags preferred by the owner, including recycled plastic grocery or newspaper bags and commercially made kitchen or other plastic bags. The pet bag further has the ability to easily carry "full" bags following owner clean up of pet waste for later disposal in an appropriate site.

Because the pet bag attaches to and is integrated with the leash, it is readily available for all activities requiring the pet to be restrained. Once stocked, the pet bag requires little attention, planning or forethought in order to be prepared for unexpected or irregular waste removal during outdoor activities. Due to its design, the pet bag can be easily removed if not needed or desired for a particular activity and easily reintegrated for the next use.

The pet bag encircles the leash and is held in place by cords being adjustable to secure the pet bag along the length of the leash. When secured, the cords form separate compartments along the pet bag's length for use as storage compartments. The pet bag can be equipped with any number of separate outer pockets for extra compartment space. The pet bag can be made from any number of flexible or semi-flexible materials including natural and synthetic fabrics, rubbers, plastics, papers or any combination thereof. The cords can similarly be made from any number of commercially available cording including natural and synthetic fiber based cording or webbing, elastic, rubber, plastic or any combination thereof. The cords can secure the pet bag to the leash by any number of means including tying, binding, using the resilience of the material they are made from or by mechanical resistance mechanisms such as adjustable toggles, cinches or hasps. The compartments formed by the cords can have openings for access to their interior or can remain closed, open at only the two ends. If the compartments have an opening, that opening can be sealable by zipper, hooks, buttons, snaps, hook-and-loop strips, synthetic materials that adhere when pressed together or any other connecting means commercially available and used on flexible openings. The pet bag can be decorated and/or dyed or have attached to it a flexible patch or other marker allowing for identification, advertising or decoration.

The main object of the present invention is to provide a storage bag for a pet leash which attaches to any leash at any place along the leash and is used for the storage of pet or owner items.

Another object of the invention is to provide a ready source of disposable pet waste retrieval baggies and a place to store the same after use for later disposal convenient to a leash.

These features, aspects and advantages of the invention are better understood with regard to the following description, claims, reference being had to the accompanying drawings forming a part of this specification wherein like reference characters designate corresponding parts in the different views.

BRIEF DESCRIPTION OF THE DRAWINGS

FIG. 3 is a side plan view of the preferred embodiment of the invention similarly secured on a portion of a pet leash.

FIG. 4 is a side cutaway view of the embodiment of FIG. 2.

FIG. 5 is a side cutaway view of the embodiment of FIG. 3.

FIG. 6 is an end cutaway view of the embodiment of FIG. 2.

Before explaining the disclosed embodiments of the present invention in detail, it is to be understood that the invention is not limited in its application to the details of the particular arrangement shown, since the invention is capable of other embodiments. The terminology used in this specification is for the purpose of description and not of limitation.

DESCRIPTION OF THE PREFERRED EMBODIMENT

Figure 1:
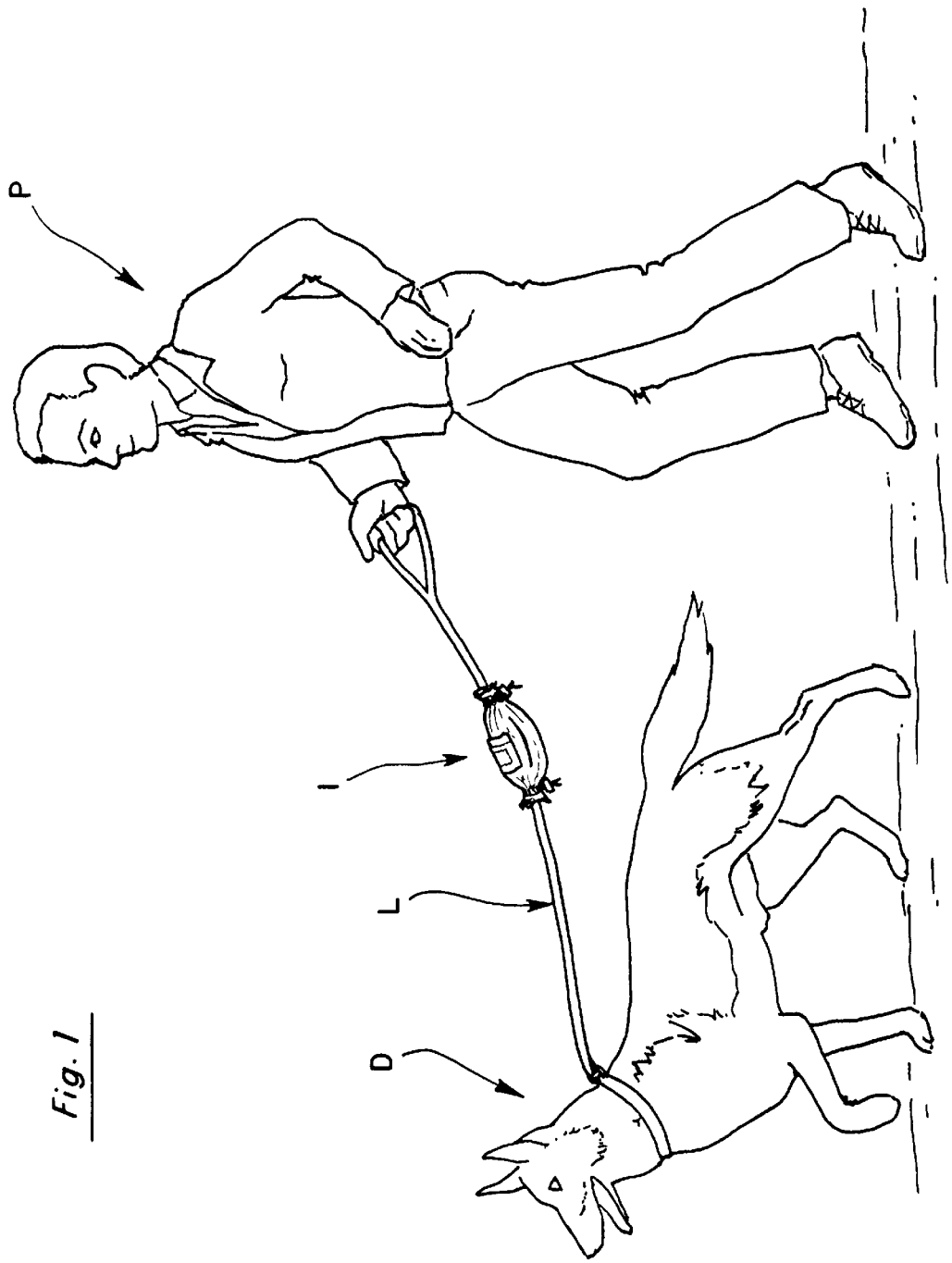
FIG. 1 is a side perspective view of an alternate embodiment of the invention as secured at a desired place along a pet's leash.

Referring first to FIG. 1, the pet bag 1 is secured along the length of the leash L between the pet D and the pet owner P.

Figure 2:
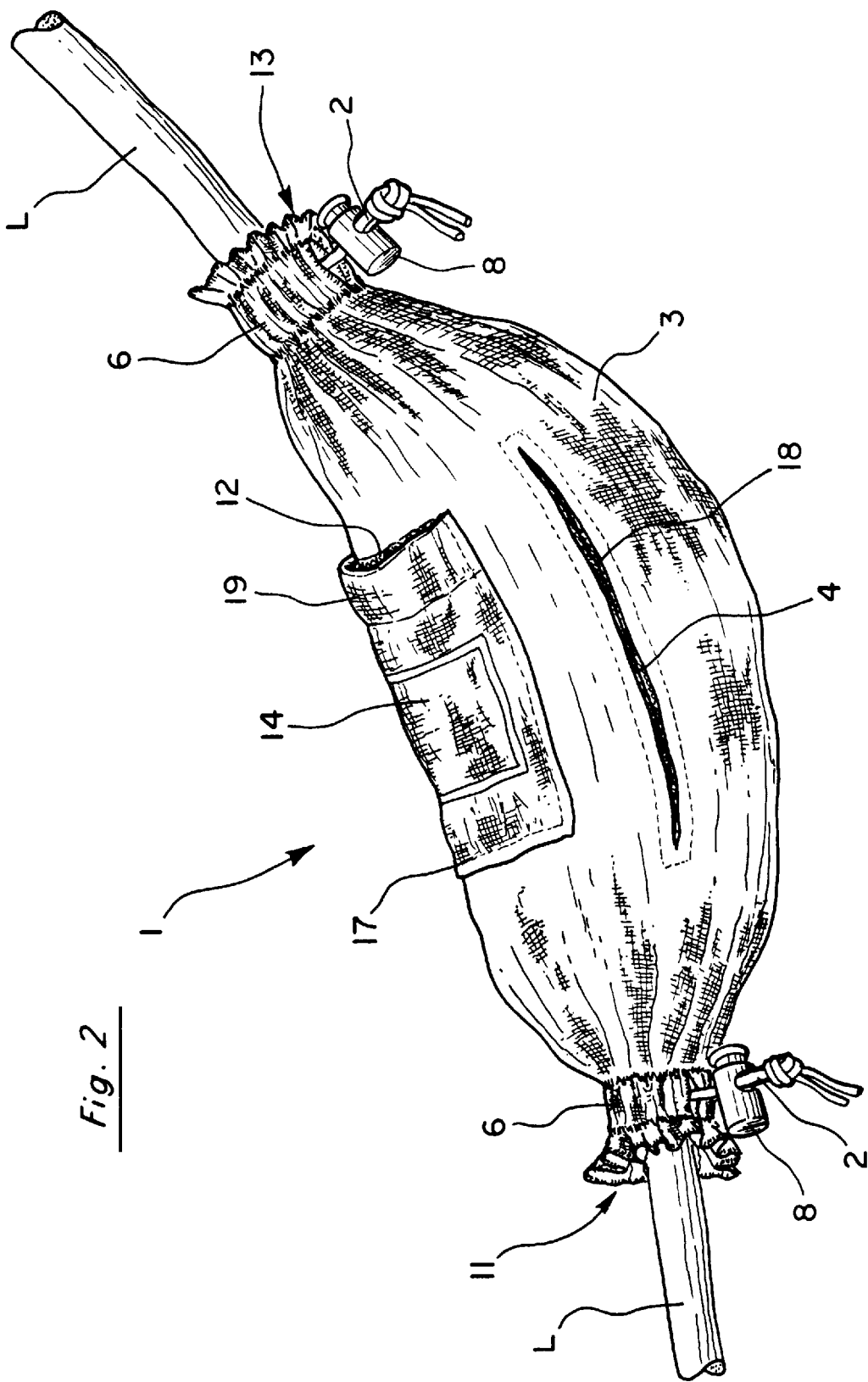
FIG. 2 is a side plan view of the alternate embodiment of the invention shown in FIG. 1 secured on a portion of a pet leash.

In FIG. 2, the pet bag 1 is comprised of a cylinder of material with an open top end 13 and an open bottom end 11 through which a leash L is threaded and secured to the leash L by cords 2. These cords 2 could be made of a non-stretchable or an elastic material. The pet bag 1 in the figured embodiment is held along the leash L by the cords 2 which, when drawn tight, encircle the leash L and draw the open ends 11 and 13 of the pet bag 1 taught against the leash L to secure it at any location desired. In this alternate embodiment, the cords 2 are fed through circumferential cord sleeves 6 formed from the material of the bag sewn to decorative rectangular strips of some similar material and are held in their taught fashion by mechanical toggle holding devices 8. With the cords 2 so secured, the bag ends 11 and 13 compress to grip the leash L. The bag 1 forms a compartment 3 around the leash with a side opening 4 for access to the compartment. The side opening 4 may extend to the full length of the compartment 3. In this embodiment, the opening 4 is held closed by a fastener 18 (such as hook and loop) allowing for closure with easy access to the interior of the compartment 3. The user can also gain access to the compartment 3 by loosening the cords 2. An exterior pocket 19 is formed on the exterior of the bag 1 with an additional piece or pieces of similar material attached by stitching 17 to the exterior of bag 1. An independent closing pocket could also be also be attached with its own defined interior, however, such is not depicted in the diagram. The pocket can be held closed by a fastener 12, similar in nature to fastener 18. A flexible indicia bearing patch 14 is affixed to the pocket 19 and, therefore, to the exterior of the bag 1 for the purpose of identification, advertising or decoration. FIG. 4 and FIG. 6 show cutaway views of the same with pet and owner articles contained within the pet bag 1.

FIG. 3 shows the preferred embodiment of the bag 10 to which an additional cord 20 has been added between the other two cords 20 to form two compartments 30 and 50. Apart from dimensions and number of elements, the bags are secured and function in the identical manner described above in the description of the embodiment shown in FIG. 1. That is the pet bag 10 is held along the leash L by the cords 20 which, when drawn tight, encircle the leash L and draw the open ends 110 and 130 of the pet bag 10 taught against the leash L to secure it at any location desired. Three cords 20 are fed through circumferential cord sleeves 60, 160 formed from the material of the bag sewn to decorative rectangular strips of some similar material and are held in their taught fashion by mechanical toggle holding devices 80. With the cords 20 so secured, the bag ends 110 and 130 compress to grip the leash L. The bag 10 forms two compartments 30 and 50 around the leash with a side openings 40 and 70 for access to the compartment. The user can also gain access to the compartments 30 and 50 by loosening either of the outermost cords 20. An exterior pocket 190 is formed on the exterior of the bag 10 with an additional piece or pieces of similar material attached by stitching 170 to the exterior of bag 10. Again, an independent closing pocket could also be attached with its own defined interior, however, such is not depicted in the diagram. The pocket can be held closed by a fastener 120, similar in nature to fastener 180. A flexible indicia bearing patch 140 is affixed to the pocket 190 and, therefore, to the exterior of the bag 10 for the purpose of identification, advertising or decoration. Openings 40 and 70 to the two compartments 30 and 50 can be secured closed or left unsecured if easier access to the compartments is desired. Side opening 40 is suited to receive baggies full of pet waste after use. FIG. 5 shows a cutaway view of the same with pet and owner articles contained within the compartments 30 and 50.

Although the present invention has been described in considerable detail with reference to certain preferred embodiments, numerous modifications and variations can be made and still the result will come within the scope of the invention. No limitation with respect to the specific embodiments described or shown in the drawings is intended or should be inferred and the spirit and scope of the claims should not be limited to the description of the preferred embodiments contained herein.

We claim:

1. In combination with a pet leash an improvement comprising:

A leash bag comprising:
 a bag formed from material folded to form a tube suited to receive the pet leash threaded therethrough;
 a plurality of elastic loops encircling the bag and functioning to encircle the pet leash and secure said bag to the pet leash at a desired position thereon; and
 a storage compartment formed between a pair of adjacent elastic loops selected from the plurality of elastic loops; wherein said storage compartment has a side opening for access to said compartment; and
 a second and third opening to the storage compartment formed by each elastic loop, said second and third openings accessible during a loose mode of each elastic loop.

2. The leash bag of claim 1, wherein said bag has a pocket attached to an exterior surface of said bag.

3. The leash bag of claim 1, wherein said loops are integrated with the bag through circumferential sleeves connected to an exterior surface of the bag.

4. The leash bag of claim 1, wherein a flexible indicia bearing patch is attached to an exterior surface of said bag for identification, decoration and advertising purposes.

5. The leash bag of claim 1, wherein said loops are held in a secured position by a mechanical loop locking device.

6. A leash bag comprising:

a bag having an open top and bottom end suited to receive a leash threaded through the top and bottom ends;

a plurality of cords encircling the top and bottom ends and a midsection and functioning to encircle the leash, secure the bag to the leash at a desired location and form an upper and lower compartment;

wherein said top end forms an opening for access to said upper compartment; and wherein the lower compartment has a side opening to allow insertion of filled waste bags.

7. The leash bag of claim 6, wherein said bag has an outer pocket attached to an exterior surface of the bag.

8. The leash bag of claim 6, wherein said cords are integrated with the bag through circumferential sleeves connected to an exterior surface of said bag.

9. The leash bag of claim 6, wherein a flexible indicia bearing patch is attached to an exterior surface of said bag for identification, decoration and advertising purposes.

10. The leash bag of claim 6, wherein said cords are held in a secured position by a mechanical cord locking device.

11. The leash bag of claim 6, wherein the cords are elastic bands.

12. A leash bag comprising:

a bag having an open top and bottom end suited to receive a leash threaded through the top and bottom ends;

a plurality of cords encircling the top and bottom ends and a midsection and functioning to encircle the leash, secure the bag to the leash and form an upper and lower compartment;

said top end forms an opening for access to said upper compartment; and the lower compartment has a side opening to allow insertion of filled waste bags.

* * * * *